United States Patent
Hecht

(10) Patent No.: US 7,989,508 B2
(45) Date of Patent: Aug. 2, 2011

(54) PROCESS AND REACTOR FOR IMPLEMENTING EXOTHERMIC AND ENDOTHERMIC REACTIONS

(75) Inventor: Thomas Hecht, Gauting (DE)

(73) Assignee: Linde Aktiengesellschaft, Munich (DE)

( * ) Notice: Subject to any disclaimer, the term of this patent is extended or adjusted under 35 U.S.C. 154(b) by 119 days.

(21) Appl. No.: 12/418,235

(22) Filed: Apr. 3, 2009

(65) Prior Publication Data

US 2009/0253815 A1    Oct. 8, 2009

(30) Foreign Application Priority Data

Apr. 4, 2008  (DE) .......................... 10 2008 017 344

(51) Int. Cl.
*C07C 27/00*    (2006.01)
(52) U.S. Cl. ...................................................... 518/700
(58) Field of Classification Search .................... 518/700
See application file for complete search history.

(56) References Cited

U.S. PATENT DOCUMENTS

2007/0172402 A1 * 7/2007 Palo et al. ..................... 422/198

FOREIGN PATENT DOCUMENTS

WO    WO 2007/139336    * 12/2007

* cited by examiner

*Primary Examiner* — Jafar Parsa
(74) *Attorney, Agent, or Firm* — Millen, White, Zelano & Branigan, P.C.

(57) ABSTRACT

Implementing at least one endothermic and/or exothermic reaction in a compact reactor which has passages for conducting gaseous and/or liquid media, through which passages the reactants of the endothermic or exothermic reaction as well as a heating medium or coolant are sent, whereby
 a) The endothermic reaction is implemented in heat exchange with a heating medium,
 b) The endothermic reaction is implemented in heat exchange with an exothermic reaction, or
 c) The exothermic reaction is implemented in heat exchange with a coolant.
The heat exchange between the media mentioned in a) to c) is carried out indirectly and via a third gaseous and/or liquid medium (moderation medium).

15 Claims, 1 Drawing Sheet

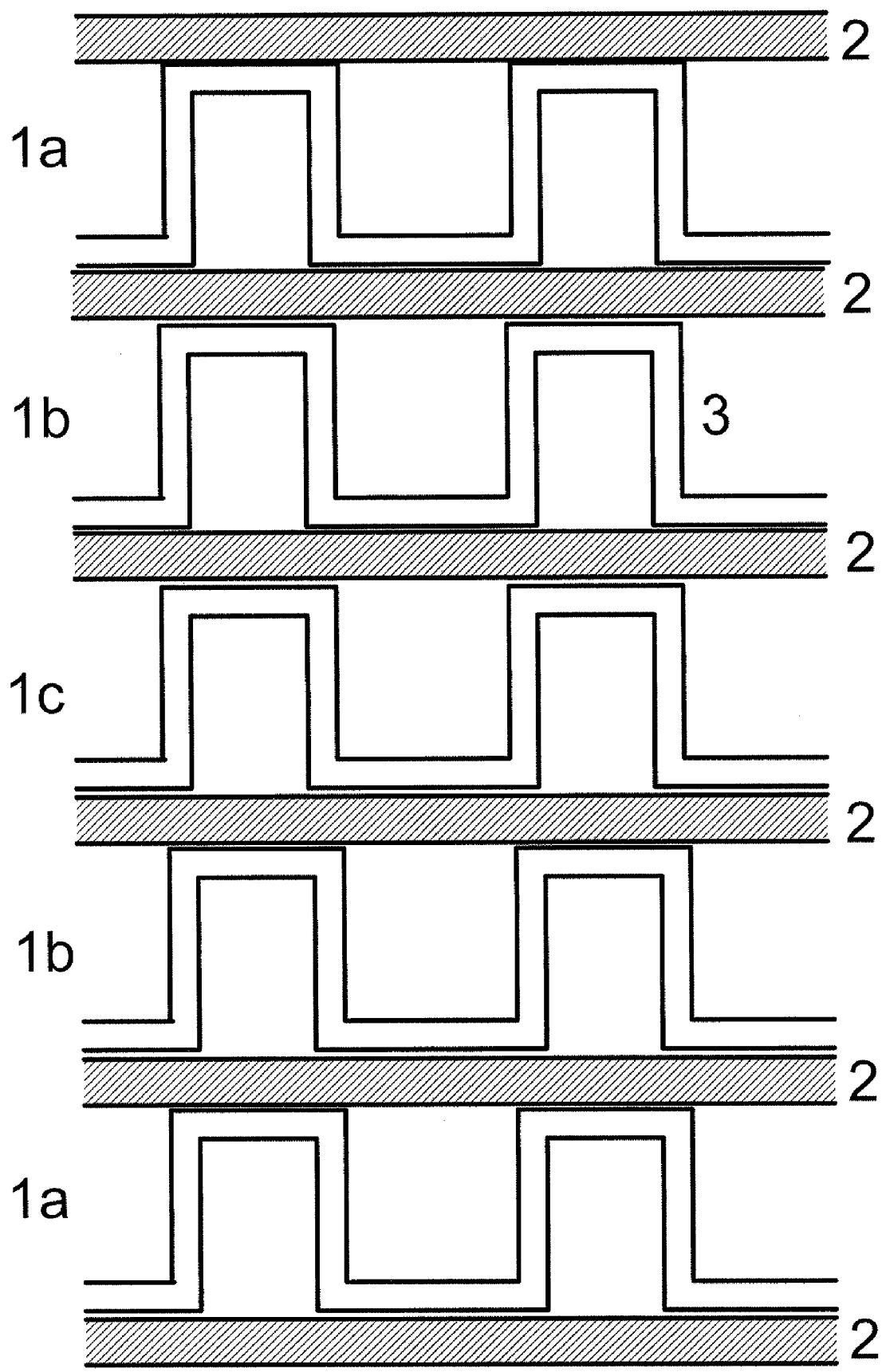

PROCESS AND REACTOR FOR IMPLEMENTING EXOTHERMIC AND ENDOTHERMIC REACTIONS

The invention relates to a process for implementing at least one endothermic and/or exothermic reaction in a compact reactor, which has passages for conducting gaseous and/or liquid media, through which passages the reactants of the endothermic or exothermic reaction as well as a heating medium or coolant are sent, whereby
a) The endothermic reaction is implemented in heat exchange with a heating medium,
b) The endothermic reaction is implemented in heat exchange with an exothermic reaction, or
c) The exothermic reaction is implemented in heat exchange with a coolant.

The invention also relates to a compact reactor as well as use of the compact reactor according to the invention. The invention is described in the example of a process for the production of longer-chain hydrocarbons from methane and a compact reactor that is used in this case for simultaneous implementation of endothermic steam reforming and exothermic catalytic combustion, without being limited thereto. The process according to the invention as well as the compact reactor according to the invention are suitable primarily for implementing any endothermic and/or exothermic reactions.

A process for converting methane to longer-chain hydrocarbon is described in the patent publication WO2007125360. Such processes are essentially based on two catalytic reactions. First, a methane-containing feedstock is sent into a process for catalytic steam reforming. Corresponding to the reaction equation

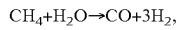

the methane of the feedstock is converted into synthesis gas. This reaction is endothermic. The necessary heat for the reaction is supplied by catalytic combustion according to the prior art. The catalytic steam reforming starts only at a temperature of 400° C. Usually, the feedstocks for the catalytic combustion reaction are sent at a temperature of about 450° C. into the process for catalytic combustion and leave the latter at a starting temperature of between 600° C. and 850° C.

The synthesis gas-containing reaction products of catalytic steam reforming are sent as feedstock into a process for Fischer-Tropsch synthesis.

Corresponding to the reaction equation

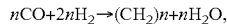

longer-chain hydrocarbons are formed from the synthesis gas. This reaction also runs on a catalyst material but is exothermic in a temperature range of between 190° C. and 280° C. For an optimum reaction sequence of the exothermic Fischer-Tropsch synthesis, the temperature has to be kept approximately constant so in the prior art the reaction is implemented by heat exchange with a coolant.

According to the prior art, both the steam reforming and catalytic combustion reactions are implemented in compact reactors. Such compact reactors have several plates with flow channels, through which the respective gaseous and/or liquid media are sent. The media on the individual plates are in indirect heat exchange with one another and vary from plate to plate.

Such a compact reactor according to the prior art for simultaneous implementation of the endothermic steam reforming and the heat-supplying exothermic catalytic combustion is described in the patent publication WO2007129108. The compact reactor consists of plates that are arranged like stacks and spaced some distance apart, which have grooves or flow channels for conducting the respective gaseous and/or liquid media. The plates in each case are separated by lateral spacers and are sealed off from one another. The compact reactor has half-shell-shaped means for feeding and removing the respective media to and from the plates, so-called headers. In the grooves for conducting the respective media, the catalyst material is introduced in the form of metal foils, such that the respective media can flow along unimpeded on the catalyst material and the respective catalytic reactions take place. As described in WO2007129108, in each case the feedstocks for the catalytic steam reforming and the feedstocks for the heat-supplying catalytic combustion are alternately sent to the plates, so that in each case an indirect heat exchange takes place between the endothermic catalytic steam reforming and the exothermic catalytic combustion on two adjacent plates. The plates that are described in WO2007129108 are 600 mm in width and 1400 mm in length.

The compact reactors and process for implementing exothermic and/or endothermic reactions according to the prior art have several drawbacks, however. In the execution of this process according to the prior art—in the compact reactors according to the prior art—only the two respective feedstock streams are sent into the compact reactor, i.e., in each case the feedstocks for an endothermic or exothermic reaction with a heating medium or coolant or only the feedstocks for the endothermic and exothermic reactions that take place simultaneously. Thus, the thermal coupling of the endothermic or exothermic reaction with the heating medium or coolant or the thermal coupling of the endothermic reaction with the exothermic reaction is very sensitive. As a result, the reaction system can be thermally unstable, i.e., the temperatures can no longer be controlled. Also, in the procedure according to the prior art, significant thermal stresses occur in the compact reactors. In the execution of the process according to the prior art, significant thermal stresses by the varying temperatures occur especially in a compact reactor for catalytic steam reforming, where an endothermic reaction and an exothermic reaction run between the adjacent plates, and the exothermic reaction is conducted with a temperature increase of about 400° C. on a length of less than 2 m. Additional thermal steam would be encountered in a compact reactor for Fischer-Tropsch synthesis. These thermal stresses are caused by, for example, local superheating, exceeding the design temperatures, or by rapid temperature changes. Such thermal stresses cause mechanical damage and in the worst case result to leakage toward the outside. This can result in, on the one hand, the destruction of the compact reactor and, on the other hand, a considerable safety risk when using explosive media.

An object of the invention is therefore to configure a process of the above-mentioned type as well as a compact reactor to implement the process such that thermal stresses are reduced and the thermal stability of the reaction system is increased.

Upon further study of the specification and appended claims, other objects and advantages will become apparent.

Within the scope of this invention, a compact reactor is defined as a device that has a number of plates that are arranged like stacks at a distance from one another, which have means for the conduction of flow of gaseous and/or liquid media, for example flow channels in the form of grooves or fins. The compact reactor also has means for feeding or removing the media to and from the individual plates. The plates usually have dimensions of between 300 mm to 15,000 mm in width as well as between 500 mm and 8,000 mm in length. In the flow channels of the plates, catalyst material is introduced at least partially such that the flow channels can be passed in addition by the respective media. This can be implemented, for example, in the form of metal foils in an arrangement similar to WO2007129108, in the form of a honeycomb structure with metal or ceramic support material, in the form of pellets, or via a surface coating of plates, flow channels or fins. A plate with its related flow channels for conducting the gaseous and/or liquid media is referred to as a passage within the scope of this invention.

To achieve the process objective of the invention the heat exchange is carried out indirectly and via a third gaseous and/or liquid medium.

The basic idea of the invention consists in decreasing the intense thermal coupling of the heat exchange of the prior art by the use of a third gaseous and/or liquid medium, referred to hereinafter as a "moderation medium". The moderation medium can be gaseous, liquid or a two-phase mixture and implement a phase conversion between gaseous and liquid or vice versa within the compact reactor. The heat exchange in the compact reactor is thus no longer carried out according to the invention indirectly via adjacent plates or passages between the media as in the prior art but rather indirectly via the moderation medium. Consequently, the invention is described into broad process aspects as follows:

Process for implementing at least one endothermic and/or exothermic reaction in a compact reactor, which has passages for conducting gaseous and/or liquid media, through which passages the reactants of the endothermic or exothermic reaction as well as a heating medium or coolant are sent, whereby d) The endothermic reaction is implemented in heat exchange with a heating medium, e) The endothermic reaction is implemented in heat exchange with an exothermic reaction, or f) The exothermic reaction is implemented in heat exchange with a coolant, characterized in that the heat exchange is carried out indirectly and via a third gaseous and/or liquid medium (moderation medium).

Between the media mentioned in a) to c) of the preamble of claim 1, there is always at least one plate or passage, on which the moderation medium is put. By the use according to the invention of the moderation medium, the thermal coupling is reduced between the media mentioned in a) to c) of the preamble of claim 1, by which the thermal stability of the system is increased. In addition, thermal stresses are reduced. The moderation medium that is conveyed according to the invention occupies an additional space between the process media and thus is used as a buffer, by which the thermal stresses are reduced. With suitable selection of the process parameters, such as, for example, starting temperature, amount and/or direction of flow of the moderation medium, the temperatures in the compact reactor can be better controlled and temperature changes over time can be kept within the allowed ranges during start-up and shutdown processes of the compact reactor.

In one configuration of the invention, the reactants of the endothermic reaction, the moderation medium and the heating medium are sent through the passages such that the heat exchange between the reactants of the endothermic reaction and the heating medium is always carried out via the moderation medium. According to the invention, in this configuration of the invention, the passages receive flow such that between one passage with the reactants of the endothermic reaction and one passage with the heating medium, there is at least one passage through which the moderation medium flows.

In another configuration of the invention, the reactants of the endothermic reaction, the moderation medium, and the reactants of the exothermic reaction are sent through the passages such that the heat exchange between the reactants of the endothermic reaction and the reactants of the exothermic reaction is always carried out via the moderation medium. According to the invention, in this configuration of the invention, the passages receive flow such that between one passage with the reactants of the endothermic reaction and one passage with the reactants of the exothermic reaction, there is at least one passage through which the moderation medium flows. In this configuration of the invention, thermal coupling between endothermic and exothermic reactions is lessened by the indirect heat transfer via the moderation medium. The depth of the attenuation can in this case be controlled in a simple way by the control of the process parameters, such as, for example, amount, temperature and/or direction of flow of the moderation medium. This configuration of the invention is especially suitable for simultaneous implementation of an endothermic steam reforming and an exothermic catalytic combustion in a compact reactor. The endothermic steam reforming is suitably implemented in heat exchange with an exothermic catalytic combustion reaction via a moderation medium.

In another configuration of the invention, the reactants of the exothermic reaction, the moderation medium and the coolant are sent through the passages such that the heat exchange between the reactants of the exothermic reaction and the coolant is always carried out via the moderation medium. According to the invention, in this configuration of the invention, the passages are receiving flow such that between one passage with the reactants of the exothermic reaction and one passage with the coolant, there is at least one passage through which the moderation medium flows. This configuration of the invention is suitable especially for implementing an exothermic Fischer-Tropsch reaction in heat exchange with a coolant via a moderation medium in a compact reactor. The reactants of the Fischer-Tropsch synthesis, the coolant and the moderation medium are sent into the passages such that between one passage with the reactants of the Fischer-Tropsch synthesis and one passage with the coolant, there is always one passage through which the moderation medium flows.

Advantageously, the reaction products of the endothermic and/or exothermic reaction can be used as a moderation medium. The respective reaction products are suitably sent completely or at least partially back into the compact reactor as a moderation medium via an optional heat exchanger to obtain the desired starting temperature.

Directing the reactants from the exothermic and/or endothermic reaction and/or the moderation medium sent in co-current flow or countercurrent flow has also proven suitable. Depending on the application, the moderation medium can flow in co-current flow with the reactants of the endothermic and/or exothermic reaction or in counterflow to the reactants of the endothermic and/or exothermic reaction.

On the apparatus, there is provided a compact reactor with a number of alternating passages, whereby the passages are suitable for conducting gaseous and/or liquid media, and which has means that are suitable for distributing two gaseous and/or liquid process media to the passages such that between passages with, in each case, one of the process media, there is at least one passage through which a third gaseous and/or liquid medium flows. The means for feeding or removing the gaseous and/or liquid media (headers) and the arrangements of the passages are configured according to the invention such that between two passages in which in each case a process medium (the reactants of the endothermic or exothermic reaction, a heating medium or a coolant) flows, there is at least one passage into which a third gaseous and/or liquid medium (moderation medium) flows.

In a preferred configuration of the invention, the compact reactor has means to direct two media through every fourth passage, offset by two passages, and a third medium through every other passage in between. In this configuration of the invention, the headers and the passages are arranged so that flows run through passages that are arranged above one another in, for example, the sequence medium 1, moderation medium, medium 2, moderation medium, medium 1, moderation medium, medium 2, etc.

In another configuration of the invention, every fourth passage has catalyst material, whereby the catalyst material is introduced into the passages such that the passage for liquid and/or gaseous media is relatively open. The catalyst material can be introduced in the form of metal foils, in the form of a honeycomb structure with metal or ceramic support material, or via a surface coating of plates, flow channels or fins in the passages. In this configuration of the invention, the reactants of an endothermic reaction or the reactants of an exothermic reaction flow through the passages that have catalyst material. Heating medium or coolant and the moderation medium flow through the remaining passages.

In another configuration of the invention, the compact reactor has two different catalyst materials that are introduced into every fourth passage, offset by two passages. In this configuration of the invention, the reactants of the endothermic reaction flow through the passages with one catalyst material and the reactants of the exothermic reaction flow through the passages with the other catalyst material, and the moderation medium flows through the other passages. In this configuration of the invention, every fourth passage thus has one catalyst material and every passage that is offset to these passages by two passages has a second catalyst material.

Advantageously, the compact reactor according to the invention and the process according to the invention for simultaneous implementation of an endothermic steam reforming and a catalytic combustion reaction are used, whereby both reactions are in heat exchange via a moderation medium.

The use of a compactor reactor according to the invention and the process according to the invention for implementing a Fischer-Tropsch reaction is also suitable, whereby the Fischer-Tropsch reaction is in heat exchange with a coolant via a moderation medium.

With this invention, it is possible in particular to stabilize the temperature control in the implementation of an endothermic and/or exothermic reaction in a compact reactor and to reduce thermal stresses with the resulting mechanical damage to the compact reactor.

BRIEF DESCRIPTION OF DRAWING

The attached FIGURE illustrates a section of a preferred compact reactor of the invention.

DETAILED DESCRIPTION OF FIGURE

The FIGURE exhibits 3 different groups of passages 1a-1c. The passages 1a-1c of the compact reactors comprise fins 3 and are separated by the separating sheets 2. Methane containing feed stream is introduced together with steam into the passages 1a. A catalytic steam reforming process takes place in the passages 1a. The fins 3 of the passages 1a are coated with a catalyst. According to the equation $CH_4 + H_2O \rightarrow CO + 3H_2$ an endothermic reaction takes place in the passages 1a. The necessary heat for the endothermic catalytic steam reforming process in the passages 1a is provided by a catalytic combustion in the passages 1c. The feed stream for the catalytic combustion in the passages 1c contains a combustible component and oxygen. The catalytic steam reforming in the passages 1a requires a starting temperature of 400° C. Therefore the feed stream for the catalytic combustion in the passages 1c is preheated to a temperature of 450° C. and leaves the passages 1c with a temperature between 600° C. and 850° C. The fins 3 in the passages 1c are coated with a catalyst.

The heat exchange between the endothermic reaction in the passages 1a and the exothermic combustion in the passages 1c is moderated by the moderating fluid in the passages 1b. The passages 1b contain fins 3 for a better heat exchange between the passages 1a and 1b respectively 1c and 1b. Gaseous nitrogen is used as moderating fluid and feed in the passages 1b. Thereby the thermal induced friction in the compact reactor due to the different temperatures in the passages 1a and 1c are reduced by the use of the moderating fluid in the passages 1b.

The preceding preferred specific embodiment is, therefore, to be construed as merely illustrative, and not limitative of the remainder of the disclosure in any way whatsoever.

In the foregoing and in the example, all temperatures are set forth uncorrected in degrees Celsius and, all parts and percentages are by weight, unless otherwise indicated.

The entire disclosures of all applications, patents and publications, cited herein and of corresponding German application No. 102008017344.4, filed Apr. 4, 2008 are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. In a process for implementing at least one endothermic and/or exothermic reaction in a compact reactor, which has passages for conducting gaseous and/or liquid media, through which passages the reactants of the endothermic or exothermic reaction as well as a heating medium or coolant are sent, whereby
    (a) The endothermic reaction is implemented in heat exchange with a heating medium,
    (b) The endothermic reaction is implemented in heat exchange with an exothermic reaction, or
    (c) The exothermic reaction is implemented in heat exchange with a coolant, the improvement comprising conducting the heat exchange indirectly via a moderation medium which is a third gaseous and/or liquid medium.

2. A process according to claim 1, wherein the reactants of the endothermic reaction, the moderation medium and the heating medium are sent through the passages, such that the heat exchange between the reactants of the endothermic reaction and the heating medium is always carried out via the moderation medium.

3. A process according to claim 1, wherein the reactants of the endothermic reaction, the moderation medium and the reactants of the exothermic reaction are sent through the passages such that the heat exchange between the reactants of the endothermic reaction and the reactants of the exothermic reaction is always carried out via the moderation medium.

4. A process according to claim 1, wherein the reactants of the exothermic reaction, the moderation medium and the coolant are sent through the passages, such that the heat exchange between the reactants of the exothermic reaction and the coolant is always carried out via the moderation medium.

5. A process according to claim 3, wherein the reactants of the exothermic and/or endothermic reaction and/or the moderation medium are sent in co-current and/or countercurrent flow.

6. A process according to claim 1, wherein an endothermic steam reforming is implemented in heat exchange with an exothermic catalytic combustion reaction via a moderation medium.

7. A process according to claim 1, wherein an exothermic Fischer-Tropsch reaction is implemented in heat exchange with a coolant via a moderation medium.

8. A process according to claim 1, wherein the moderation medium comprises reaction products of endothermic and/or exothermic reactions.

9. A process according to claim 1, comprising conducting a simultaneous endothermic steam reforming reactor and a catalytic combustion reaction, with both reactions being in heat exchange with each other via said moderation medium.

10. A process according to claim 1, comprising conducting a Fischer-Tropsch reaction in heat exchange with a coolant via said moderation medium.

11. A process according to claim 1, wherein the moderation medium is neither a product nor a reactant in the endothermic and exothermic reactions.

12. A process according to claim 11, wherein the moderating medium is gaseous nitrogen.

13. A process according to claim 11, comprising conducting a simultaneous endothermic steam reforming reactor and a catalytic combustion reaction, with both reactions being in heat exchange with each other via said moderation medium.

14. A process according to claim 1, wherein the moderating medium is gaseous nitrogen.

15. A process according to claim 13, wherein the moderating medium is gaseous nitrogen.

* * * * *